United States Patent [19]

Ouchi

[11] Patent Number: 4,626,721
[45] Date of Patent: Dec. 2, 1986

[54] ELECTRICAL CONNECTOR FOR SUBMERGIBLE MOTOR PUMP ASSEMBLY

[75] Inventor: Kiyoshi Ouchi, Fujisawa, Japan

[73] Assignee: Ebara Corporation, Tokyo, Japan

[21] Appl. No.: 707,832

[22] Filed: Mar. 4, 1985

Related U.S. Application Data

[62] Division of Ser. No. 472,833, Mar. 7, 1983.

[30] Foreign Application Priority Data

Dec. 15, 1982 [JP] Japan .................. 57-21949

[51] Int. Cl.$^4$ .............. H02K 5/132; H02K 5/22; H01R 13/40
[52] U.S. Cl. ..................... 310/71; 310/43; 310/87; 174/76; 174/151; 339/94 R; 339/218 R
[58] Field of Search ............ 310/71, 87, 88, 89, 310/43; 174/18, 65 R, 76, 77 R, 151; 339/94 R, 218 R, 103, 213, 59

[56] References Cited

U.S. PATENT DOCUMENTS

| | | | |
|---|---|---|---|
| 2,944,291 | 7/1960 | Maynard | 310/87 |
| 3,816,641 | 6/1974 | Iverson | 174/77 R |
| 3,997,232 | 12/1976 | Dunaway | 310/87 |
| 4,053,201 | 10/1977 | Grappe | 339/218 R |
| 4,266,844 | 5/1981 | Chelminski | 339/103 R |
| 4,293,178 | 10/1981 | Lee | 174/65 R |

FOREIGN PATENT DOCUMENTS

| | | |
|---|---|---|
| 3013119 | 9/1929 | Japan . |
| 123420 | 8/1955 | Japan . |
| 30-17657 | 12/1955 | Japan . |
| 35-13413 | 6/1960 | Japan . |
| 50-32792 | 9/1975 | Japan . |
| 57-47852 | 3/1982 | Japan . |
| 101571 | 6/1982 | Japan . |

Primary Examiner—Patrick R. Salce
Assistant Examiner—D. L. Rebsch
Attorney, Agent, or Firm—Oblon, Fisher, Spivak, McClelland & Maier

[57] ABSTRACT

A submergible motor pump assembly with easy access to any part of the assembly by dismantling minimum elements, i.e. without requiring disassembly of the whole and without requiring discharge of lubricating oil for a mechanical seal. Also, plural balance holes are provided in the main plate of the impeller, and a liner ring is disposed between the main plate and the top wall of the impeller chamber, to establish the flow passage from the tip of the impeller blades through the gap between the main plate and the top wall of the chamber to the balance holes, with flow zones restricted by the liner ring. The five part input power connector includes a tapered rubber boot clamped to a plastic cap in which the terminals are further sealed in place by a resin fill.

1 Claim, 8 Drawing Figures

4,626,721

ELECTRICAL CONNECTOR FOR SUBMERGIBLE MOTOR PUMP ASSEMBLY

This is a division of application Ser. No. 472,833, filed Mar. 7, 1983.

FIELD OF THE INVENTION

The present invention relates to the construction of a submergible motor pump assembly, and more particularly to the construction of a connector for securing a cable end to a motor section of a submergible motor pump assembly wherein disassembly and reassembly may be done easily and accordingly the water tight characteristic may be improved.

BACKGROUND OF THE INVENTION

The conventional submergible motor pump assembly has been unitarily constructed with a pump section and a motor section, and such a construction could not be thought to be convenient in respect to disassembly and reassembly. On the other hand, a submergible motor pump to be used in particular for civil work or the like has to be adequately maintained because the wear and the damage of the pump elements are more conspicuous due to suction of dirty liquid containing sand, mud and the like. Further, the motor section may likely be subjected to overload because of severe conditions of operation. Accordingly the submergible motor pump assembly in particular for the use in civil work or the like is to be adequately maintained regularly.

Many of the conventional submergible motor pump assemblies are, however, difficult in disassembly and reassembly. Particular difficulty is found in disassembly of the motor section, and there are pump assemblies which cannot be disassembled without disassembling the pump section in advance of the disassembly of the motor section. Further, there are such pump constructions wherein in case of inspection of the mechanical seal the stuffing box oil cannot be drained out unless the impeller is dismantled. In one example of such construction, when only the pump cover at the periphery of the motor which serves to pass the water delivered from the pump section upward is desired to be dismantled, both the motor frame and the rotor have to be dismantled or the upper bracket of the motor has to be dismantled, which means the motor will be substantially entirely disassembled. In another example of such constructions the mounting piece for the cable connector is fixed to the pump cover and when it is desired to disconnect the cable connector, the cable connector cannot be disconnected except from inside of the pump cover and if the pump cover is therefore dismantled, the lead wire from the stator coil connected to the cable has to be drawn out simultaneously.

FIG. 1 is the drawing showing the seal means for the shaft of the pump of prior art adapted to deliver the liquid or slurry containing foreign matter.

The pump shaft 7 integral with the motor shaft extends through the shaft sealing means 6 and also through the oil seal 9 with the collar 20 disposed between the shaft seal means and the oil seal, said oil seal 9 being attached to the intermediate casing 2 connecting the pump casing and the motor frame and forming a part of the pump casing to the end of the shaft is secured the impeller 18 via a key and a nut 17 is provided for fixing the impeller at the end of said shaft. In the conventional sealing means of the kind above explained, a mechanical seal or a gland packing is used at the rear side of the impeller. Without protection, the mechanical seal or gland packing will be exposed to the slurry. Therefore, the oil seal as shown in FIG. 1 or a labyrinth seal or the like not shown is provided below the mechanical seal so as to prevent ingress of the slurry. It has been found, however, that the oil seal or labyrinth seal alone could not completely prevent ingress of the slurry.

FIG. 2 is the vertical sectional view of the cable connector for the submergible motor pump assembly showing a conventional example thereof.

The cable 54 and the core wires 111 are connected together by means of the connecting member 112. The terminal of the cable is formed by the hermetic material 113 with a flange, said hermetic material 113 being molded of rubber integrally with the connecting members 112 together with the cable 54 and the core wires 111 provided at the opposite side of the connecting member. Then the cover 114 is placed over the hermetic material 113 and the screws with sealing means are turned into the motor cover 41 through the holes of the cover 114 and the hermetic material 113, the cover 114 thus being secured to provide sealing effect.

According to the outlet construction for the cable in the conventional submergible motor pump, the hermetic material 113 is formed integrally with the outer cover or the like of the cable 54. Therefore, it has to be manufactured at a certain specialized factory and it may take time to procure an alternate element for replacement thereof. Besides, it is impossible to exchange only the cable 54 in the case of repair and thus such a construction as above will not be suitable for the pumps handling the slurry or the like which must be disassembled or reassembled rather frequently, to say nothing of periodical or optional frequency in case water tightness is impaired.

SUMMARY OF THE INVENTION

The object of the present invention is to provide a submergible motor pump wherein the pump section and the motor section are independent of one another each being able to be sequentially disassembled.

A further object of the present invention is to provide an outlet construction for the cable connection which enables maintenance to be easily executed by using a commercially available cable in the submergible motor pump assembly.

A still further object of the present invention is to provide a pump shaft sealing means with the protection means for the shaft sealing means which is not damaged due to, in particular, the slurry or the like.

Since the present invention is directed to provide easy disassembly and reassembly of the submergible motor pump, as well as adequate protection for the water sealed part and easier maintenance of the water sealed part, the present invention is intended in general to provide a submergible motor pump assembly excellent in repair and maintenance.

The submergible motor pump assembly according to the present invention has balancing holes in the impeller. A protection means is provided for the shaft seal including an elastic body member having the function as the liner ring and a dust seal is provided at the intermediate casing connecting the motor and the pump casings and also forming a part of the pump casing. The protection means is opposite the back side of the main plate of the impeller with a small clearance between the annular projected portion and the outer periphery of the boss of the impeller and the protection means. The motor section is disposed above the lower bracket of the submergible motor pump. The pump section is disposed below the lower bracket of the submergible pump; the motor and pump sections may be dismantled in sequence from the members arranged outwardly of other members without affecting the members arranged inwardly of other members, while the motor frame of said motor section may be dismantled together with the bearing plate carried by the motor frame, the upper bracket, connector and so forth. The pump section may be dismantled by dismantling the suction cover alone while the pump casing may be also dismantled leaving the suction cover secured as is. The stuffing box oil can be drained from outside of the mechanical seal part. The main pump shaft may be dismantled while leaving the mechanical seal within the casing. The connector means connecting the cable and the stator coil is provided in abutment with the bottom of the hole for the cable outlet of the motor cover. The connector cover provided with the projection for positioning the cable and the hole through which the resin will be injected is placed in abutment with the connector at the circumference of the part where the cable is to be extended through. The connector cover is filled inside with the resin injected through said hole for resin injection. The cable boot in abutment with the upper part of the connector cover and the end of the cable outlet of the motor cover and having the cable tightly extending through the center thereof is covered with the cover which is secured to the motor cover.

The embodiment of the present invention will now be described with reference to the accompanying drawings.

DETAILED DESCRIPTION OF THE PREFERRED EMBODIMENT

Figure 1:
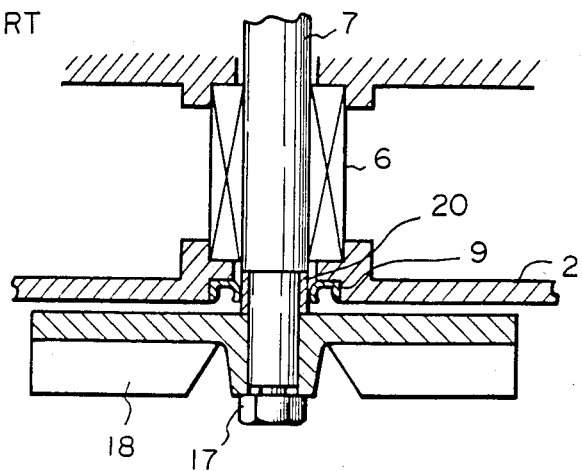
FIG. 1 is the vertical sectional view of the conventional submergible motor pump assembly.
Figure 2:
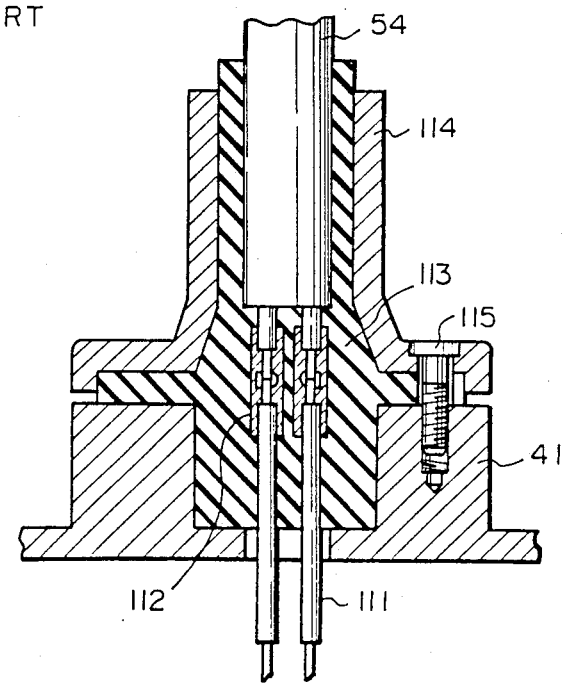
FIG. 2 is the vertical sectional view of the conventional cable connector for a submergible motor pump assembly.
Figure 3:
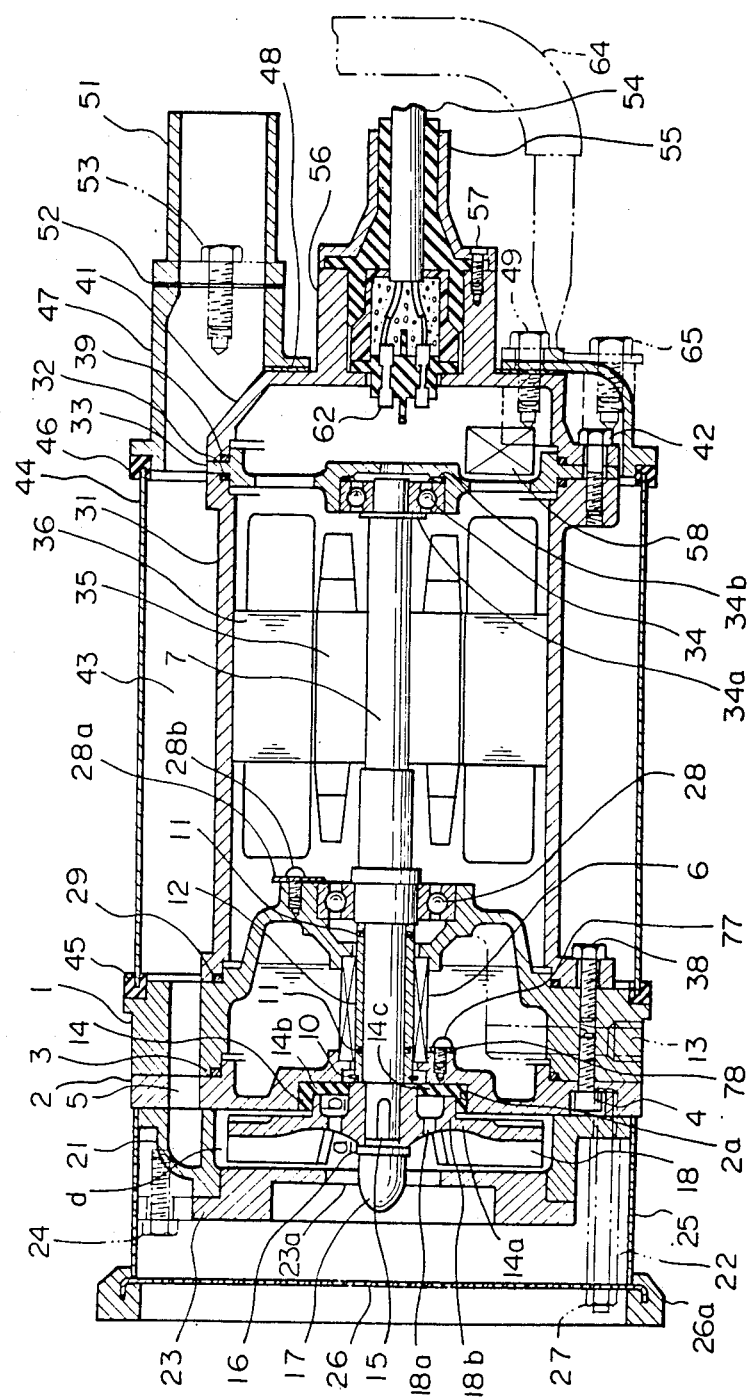
FIG. 3 is a vertical sectional view of the submergible motor pump assembly according to the present invention.

FIG. 3 illustrates the vertical section of the submergible motor pump assembly according to the present invention. It is to be noted that for the purpose of illustration, the pump is shown turned horizontally wherein the right side of the drawing is the upper part of the pump in its operation. The lower bracket 1 and the intermediate casing 2 are abutted together with the seal ring 3 in between. The bolts 4 extend through the bores of the intermediate casing 2 and are screwed into the female thread provided at the lower bracket 1 to joint the lower bracket 1 and the intermediate casing 2.

Figure 4:
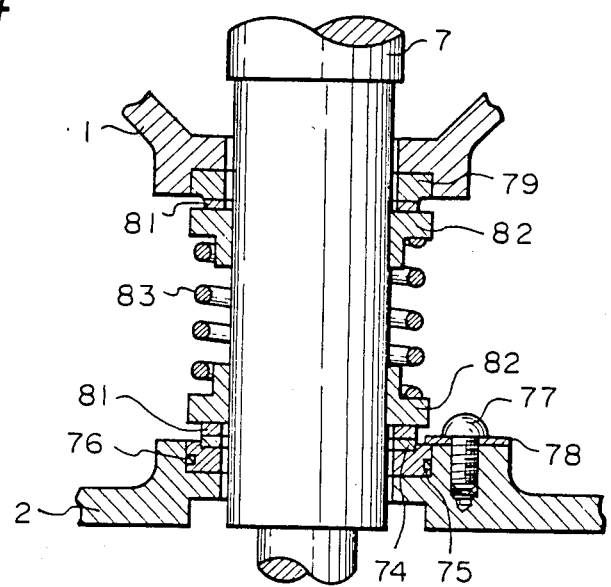
FIG. 4 is the vertical sectional view of the preferred sealing means to be used for the embodiment shown in FIG. 3.

Passage 5 is provided through the lower bracket 1 and the intermediate casing 2 for delivering water. Between the lower bracket 1 and the intermediate casing 2 is attached a mechanical seal 6 which is provided between the bracket 1 and casing 2 and the sleeve 12 through which the pump shaft 7 extends and is provided with O rings 11 on the inner surfaces at opposite ends thereof. Oil for lubricating as well as cooling may be filled in or drained out of the space formed between the lower bracket 1 and the intermediate casing 2 by means of the plug 13 provided at the lower bracket 1. The mechanical seal 6 may be of a conventional design in which the mechanical seal can be directly placed on the pump shaft 7 as shown in FIG. 4. A preferable embodiment of the mechanical seal will however be explained later with reference to FIG. 5.

At the lower part of the intermediate casing 2 is fit a liner ring 14. The impeller 18 is attached to the end of the pump shaft 7 by a key 15 and secured thereto by means of a nut 17 screwed into the pump shaft with a washer 16 placed therebetween. The outer periphery of an annular projected portion 18b of the impeller concentric with the rear side of the main plate of the impeller is inserted into the inner periphery of the cylindrical liner portion 14a of the liner ring 14 with a small clearance to allow relative rotation. The end surface of said annular portion 18b is located closely to the end plate part 14b of the liner ring with a small clearance to allow relative rotation. The dust sealing portion 14c at the central bore of the liner ring 14 is located adjacent to the outer periphery of the boss part of the impeller 18 with a small clearance to allow relative rotation. The liner ring 14 is press fit into the cylindrical bore 2a provided on the intermediate casing at the side of pump casing 21 so that it touches the bottom face of said bore 2a. At the main plate of the impeller are provided balance holes 18a inwardly of the annular portion 18b. The liner ring 14 is preferably made of elastic material such as rubber or the like. Stay bolts 22 extend through the bores provided at the pump casing 21 encasing the impeller 18 and are screwed into the female threads of the intermediate casing 2 whereby the pump casing 21 and the intermediate casing 2 are securely joined. The suction cover 23 is secured to the pump casing with sealing material applied to the faces of mutual abutment. Bolts 24 are screwed through the bores provided in the suction cover 23 into the pump casing 21. At the center of the pump casing is provided a hole allowing the impeller 18 to pass therethrough. A strainer 25 is disposed along the outer periphery of the portion where the pump casing 21 is attached to the intermediate casing 2. In order to retain said strainer 25 with the circumferential edge 26a fitted along the outer periphery of the pump base 26, the pump base 26 is provided with the holes receiving the stay bolts and thus fastened by the nuts 27 at the ends of the stay bolts 22.

The pump shaft 7 is carried by the lower ball bearing 28 fit into the lower bracket 1 and the upper ball bearing 34 fit into the bearing support plate 33 which is attached to the motor frame 31 with a seal ring 32 placed therebetween, the motor frame 31 being in turn fit to the lower bracket 1 with another seal ring 29 placed therebetween. The pressure plate 28a is secured to the lower bracket 1 with screws 28b so that the lower ball bearing 28 may be depressed by said pressure plate 28a. Between the upper ball bearing 34 and the bearing support 33 is resiliently pressed a wave washer 34b. To the pump shaft 7 is secured a rotor 35 and to the motor frame 31 is secured a stator 36. The motor frame 31 is fixed to the lower bracket 1 by means of the bolts 38 extending through the bores provided at the lower end flange of the motor frame and being screwed into the female threads of the lower bracket 1.

The motor cover 41 is fit into the bearing support plate 33 with a seal ring 39 placed therebetween. Bolts 42 are screwed into the motor frame 31 through the holes provided both at the motor cover 41 and the bearing support plate 33 to join the motor cover 41 and the bearing support plate 33.

The pump cover 44 of cylindrical shape is covered over the motor frame 31 to form a passage 43 for the water to be delivered. The pump cover 44 is fitted with a boot 45 of elastic material at the lower end. The boot 45 is inserted into the stepped part at the outer periphery of the lower bracket 1. The pump cover 44 is fitted with another boot 46 of elastic material at its upper end, the boot 46 being inserted into the stepped portion of the end cover 47. The inner side portion of the upper end part of the end cover 47 is abutted against the motor cover 41 with a packing 48 placed therebetween, and bolts 49 are screwed into the motor cover 41 through holes provided in the end cover 47 and the packing 48. To the end cover 47 is attached a hose coupling 51 with a packing 52 therebetween, and bolts 53 are screwed into the end cover 47 through the holes provided for the bolts at the hose coupling 51 and the packing 52. Although it is not shown, a hose may be coupled to the hose coupling 51 by means of a hose joint. Water is delivered from the swirl chamber of the pump casing 21 and passes through the passage 5 defined by the intermediate casing 2 and the lower bracket 1 and then through the passage 43 defined between the pump cover 44 and the motor frame 31 to the end cover 47 and finally delivered out of the hose coupling 51.

A connector seat portion 56 is formed integrally with the upper part of the motor cover 41 for the connector 55 leading the submergible cable 54 into the inside of the motor to be water sealingly inserted to the seat portion, said seat portion being cylindrical and projecting outwardly through the central aperture of the end cover 47. Machine screws 57 provided with seals are screwed into the seat portion 56 for the connector 55 through the bores provided at the connector 55 to be inserted into the seat portion 56. The detail of the connector 55 is to be described later.

Inside of the motor cover 41, a safety means such as a circuit breaker 58 is secured to the bearing support plate 33. The bearing support plate 33 is provided with holes for passing therethrough the wiring between the stator 36 and the terminal 62 of the connector 55 and the wiring between the circuit breaker 58 and the stator 36.

A handle 64 is secured to the end cover 47 by means of a bolt 65. The handle is secured to another portion of the end cover in a similar way at the spaced position (not shown) from the position of the bolt 65 shown in the drawing.

In the foregoing description, the seal rings 3, 29, 32 and 39 are all the same size, and the diameters of the stepped portions to be sealed by the seal rings are all the same, which serves to minimize the number of kinds of seal rings to be prepared for maintenance.

Figure 5:
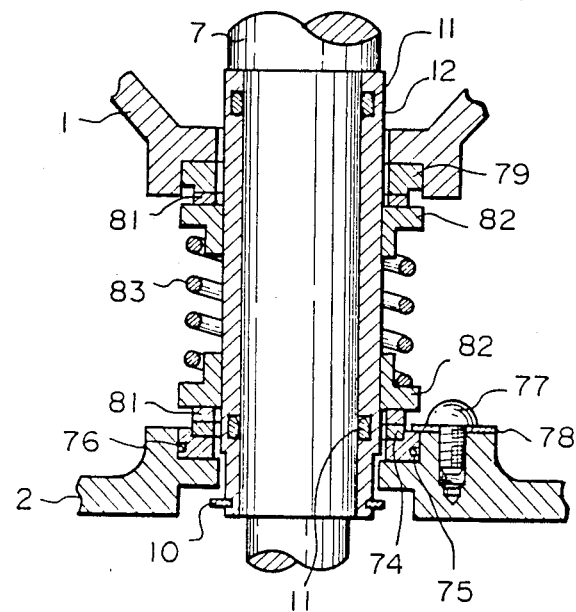
FIG. 5 is the explanatory drawing of the sealing means for the pump shaft shown in FIG. 3.

FIG. 5 shows the detail of the mechanical seal according to the present invention.

The fixed seal ring 75 with the sliding ring 74 secured thereto is provided at the outer circumference with a seal ring 76 inserted thereto and fitted into the intermediate casing 2 and prevented from axial detachment by means of the pressure plate 78 fixed to the intermediate casing by machine screws 77. The inside diameter of the fixed seal ring 75 is so selected as to provide clearance enough to bring about a pressure reduction effect relative to the sleeve 12. The sliding ring 79 is fit into the central boss of the lower bracket 1. A pair of floating seat rings 82,82 with a pair of sliding rings 81 secured between the floating seat rings 82,82 and the sliding rings 74, 79 are sealingly and axially movably placed around the sleeve 12. Between the floating seat rings 82,82, a compressed spring 83 is provided and urges rings 81,81 against the sliding rings 74, 79 respectively, by way of the floating seat rings 82.

Figure 6:
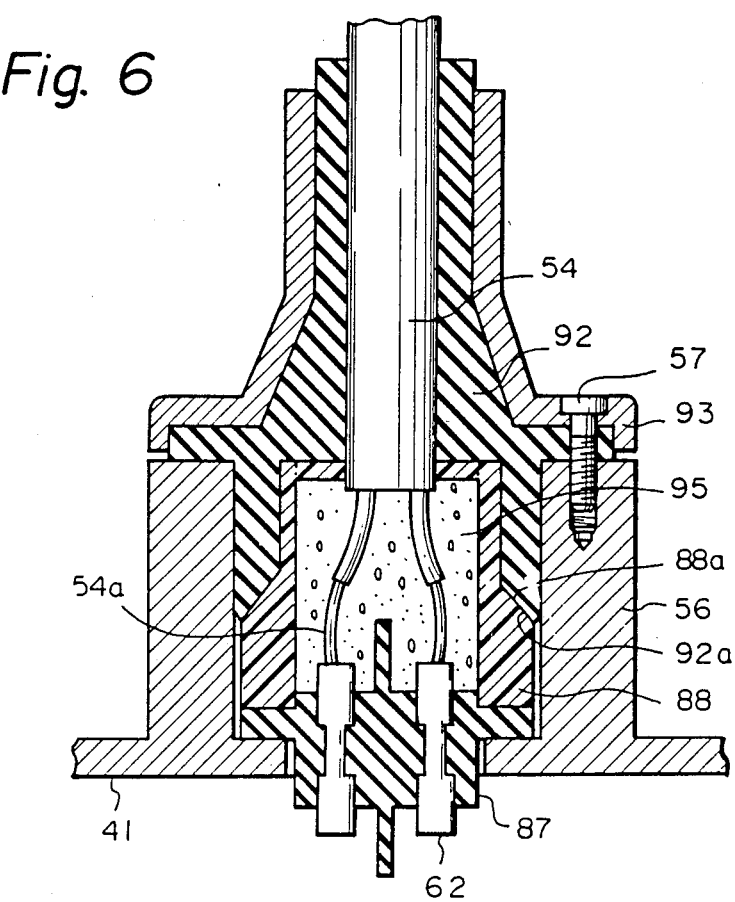
FIG. 6 is the vertical sectional view of the embodiment of a cable connector.
Figure 7:
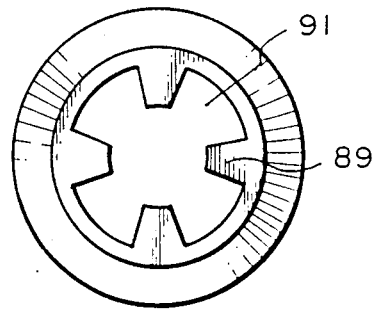
FIG. 7 is the plan view of a part of the cable connector shown in FIG. 6.

The outlet portion for the submergible cable 54 from the motor cover 41 is constructed as shown in the vertical sectional view of FIG. 6. In this particular embodiment, the cable is shown as one having a single phase while the similar construction is also applicable in case of one for three phases. At the bottom of the cable outlet portion of the cable seat portion 56 of the motor cover 41, the outer side of the connector 87 is provided with the terminals 62 and also covering the terminals sealingly with insulating material, the terminals being connected to the core wires 54a of the cable 54. A connector cover 88 made of plastic material or the like is in abutment with the connector 87. As shown in the plan view of FIG. 7, projected portions 89 are provided in the direction toward the center of the connector cover 88 at the upper part of the cover 88. The tips of said projected portions 89 abut with the outer circumference of the cable 54 so as to position and laterally support the cable, while the spaces between the adjacent projected portions 89 serve as the inlets 91 through which the stuffing material is to be injected. The inlets 91 may be provided at the side of the connector cover 88. Tapered portion 88a is formed on the connector cover 88.

With the upper surface, the outer circumference of the upper part and tapered portion 88a of the connector cover 88 being in abutment with the boot 92 and with the flange portion of the boot 92 made of elastic mateial such as rubber being closely abutted with the hole of the cable outlet part of the motor cover 41 and the cable 54, the boot 92 and the connector cover 88 are inserted into the end of the cable outlet of the motor cover 41 and in abutment therewith. The boot 92 is closely encased by a metallic cover 93 and machine screws 57 with sealing means extending through the bores provided for the screws at the cover 93 and the flange of the boot 92, and are screwed into cable seat 56 of the motor cover 41 and fastened thereto.

The cable 54 is a standard type cable, the end of which initially is not within a molded element. The cover 93, the boot 92 and the connector cover 88 are first put over the cable. Then the core wires 54a are peeled off of the end of the cable 54 and tied to the terminals 62 of the connector 87. Subsequently the connector cover 88 is slid along the cable 54 downwardly to be fitted to the connector 87. In this condition, a filling agent 95 of such materials as resin or the like having electrically insulating properties and liquified sufficiently for filling and curable at room temperature is filled from the inlets 91 to fill the inside of the connector cover 88. After the filling agent 95 has been cured, the boot 92 is pushed onto the connector cover 88 and the connector and the boot together are inserted into the cable outlet of the motor cover 41. Then the cover 93 is placed on the boot 92 and secured to the motor cover 41 by means of machine screws 57.

When the machine screws 57 are tightened, the cover 93 will depress the boot 92, thereby depressing the end face of the cable outlet portion of the motor cover 4 as well as the connector cover 88. Since the boot 92 is made of such elastic material as rubber or the like, the volume will remain unchanged, whereby the boot 92 will be pressed against the upper surface and outer circumference of the connector cover 88 and at the same time the inner surface of the aperture of the cable outlet portion of the motor cover 41. Further, since the boot 92 is provided with the tapered portion 92a conforming in shape to the tapered portion 88a of the connector cover 88, the aperture of the cable outlet portion of the motor cover 41 and the connector cover 88 are forcibly pressed against each other at these tapered portions.

By tightening the machine screws 57, the connector cover 88 is pressed and the connector cover 88 in turn presses the connector 87 against the bottom of the aperture provided at the cable outlet portion of the motor cover 41. For such purpose, the connector 87 will be made preferably of elastic material such as rubber or the like.

Figure 8:
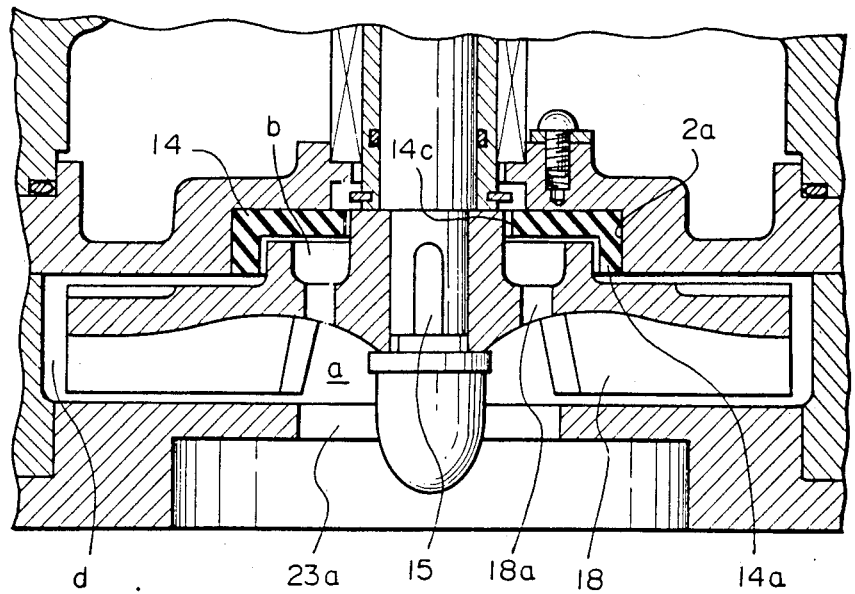
FIG. 8 is the enlarged view of a part of FIG. 3.

The submergible motor pump assembly thus constructed will, when energized through the submergible cable 54, cause the rotor 35 to rotate to transmit rotational force to the pump shaft 7 whereby the impeller 18 will be caused to rotate by means of the pump shaft 7 via the key 15. By rotation of the impeller 18, the liquid to be treated will be sucked through the strainer 25 and pass through the suction port 23a. Then the impeller increases the velocity and pressure of the liquid which is subsequently delivered out of the swirl chamber at the outer periphery of the impeller and passes through the passage 5 and the passage 43 defined between the pump cover 44 and the motor frame 31 and then through the end cover 41 and is delivered upward through the coupling 51 by the delivery pipe, not shown, connected to the coupling 51. At the time of delivery of the liquid, since the pressure of the liquid at the suction port 23a of the impeller will be lower than that of the liquid at "d" shown in FIG. 8, and also somewhat lower than that of the liquid at the side "b" of the mechanical seal, the flow of the liquid will be directed through the space between the main plate of the impeller 18 and the intermediate casing 2 to reach the portion "b". The liquid will then flow through the balance holes 18a down to the location "a" at the side of suction port. The foreign materials contained in the liquid or slurry will also flow in this direction at the same time. Since both the annular portion 14a and the dust seal portion 14c of the liner ring 14 are positioned in proximity to the impeller 18, the occurrence of wear due to abrasion with slurry is limited to the impeller 18 and the liner ring 14.

Manner of disassembly of the submergible motor pump assembly constructed as above will now be explained.

Disassembly of the pump section will firstly be explained in accordance with the steps of disassembly. By dismantling the nuts 27, the pump base 26 may be disassembled out of the stay bolts and the strainer 25 fit in the pump casing 21 may be taken out. At this stage, any choking of the strainer 25 may be cleaned. The suction cover 23 may be disassembled from the pump casing 21 by dismantling the bolts 24. In this condition, the impeller 18 may be observed as to presence of any irregularities such as wear. When the mounting nut 17 for the impeller is disengaged from the end of the pump shaft 7, the impeller 18 may be ready for taking out. At this time, the impeller 18 may be pulled out of the pump shaft 7 by use of a pulling device engaged with the balance holes 18a and the end of the pump shaft 7.

By screwing out the stay bolts 22 from the pump casing 21, the pump casing may be detached from the intermediate casing 2 whereby detachment of the impeller 18 may further be facilitated. In this case, the pump casing 21 may be detached together with the suction cover 23, even if the suction cover is left in the pump casing.

When the impeller is taken out of the pump shaft 7, the impeller may be closely checked. In this way, the wear conditions of the key 15 at the end of the pump shaft 7, the groove receiving the key 15, the inner circumference of the boss of the impeller 18, the outer circumference of the boss of the impeller oppositely facing the liner portion 14c of the liner ring and the liner portion 14b and the liner portion 14a of the liner ring 14 may be observed.

When it is necessary to check the mechanical seal 6, the plug 13 is unscrewed and the oil contained between the lower bracket 1 and the intermediate casing 2 should be drained out. Then the snap ring 10 for the pump shaft fit in the sleeve 12 is disengaged (this work will not be necessitated for such a mechanical seal as not provided with the sleeve, since there is no snap ring 10 used).

Under this condition, if the bolts 4 are unscrewed and pulled axially so as to dismantle the intermediate casing 2 from the lower bracket 1, the intermediate casing 2 may be separated from the lower bracket 1 together with the liner ring 14, fixed seal ring 75 (see FIG. 5), seal ring 76, presser plate 78 and the machine screws 77 so that the mechanical seal 6 can be seen (the same can be said of the mechanical seal not provided with the sleeve 12).

Under this condition, the elements of the mechanical seal 6 which have been urged and compressed by the lower bracket 1 and the intermediate casing 2 may more axially along the sleeve 12 (in case of the mechanical seal not provided with the sleeve 12, they may move along the pump shaft 7).

To dismantle the mechanical seal 6, the sleeve 12 is to be axially pulled outwardly from the pump shaft 7 by use of a puller and the sleeve 12 will be slid off carrying the mechanical seal thereon. In that case, the sliding ring 79 is left fit in the lower bracket 1. However, if the intermediate casing 2 is detached without removing the pump shaft snap ring 10, the sleeve 12 may be taken out as a unit carrying the movable elements of the mechanical seal 6 thereon (in case of the mechanical seal not provided with the sleeve 12, the sliding ring 81, the shiftable ring 82 and the spring 83 have to be pulled out of the pump shaft 7 respectively).

Reassembly of the pump section may be practiced in the reverse manner from that of disassembly.

The mechanical seal 6 may be assembled in such a manner that the sliding ring 79 will be fit in the lower bracket 1, the sliding ring 74 and the fixer liner ring 75 will be attached to the intermediate casing 2, the movable elements of the mechanical seal will be assembled on the sleeve 12 and the O ring will be put into the circumferential groove of the sleeve, the movable elements of the mechanical seal being assembled as a unit.

The lower bracket 1 and the intermediate casing 2 provided in advance with the liner ring 14 fit therein will be joined together with the seal ring 3 therebetween. On such occasion, the mechanical seal 6 will be assembled with the intermediate casing 2 together with the sleeve 12 and relative parts as a unit as above-mentioned. In such a case, the mechanical seal is pushed along the pump shaft 7 if such a shaft is available. In case there is not such a pump shaft available, the mechanical seal will be retained by the holes provided respectively at the lower bracket 1 and the intermediate casing 2. (In case of the mechanical seal not provided with the sleeve 12, it is assembled by fitting the sliding ring 81, the shiftable ring 82 and the spring 83 on the pump shaft 7.)

In such case that the pump shaft 7 has not yet been assembled, namely, the motor section is still in a disassembled condition, the pump shaft 7 will be fit into the sleeve 12 as explained later in the course of assembly of the motor section, if reassembly of the pump section is desired.

Then the impeller 18 is fit to the end of the pump shaft 7 with the key 15 and fixed by the fixing nut 17 with the washer 16 in between. The pump casing 21 alone or attached with the suction cover 23 will be abutted with the intermediate casing 2 and secured thereto by the stay bolts 22. When the suction cover 23 is not yet attached, then the suction cover 23 is fit in the pump casing 21 and secured with the bolts 24.

Next, the strainer 25 will be fit on the pump casing 21, the holes for the stay bolts of the pump base 26 will be aligned with and put on the end of the stay bolts 22, and the nuts 27 will be screwed into the stay bolts to secure the pump base 26, as well as the strainer 25.

Disassembly of the motor section will now be explained in the procedural order.

Although the hose serving as the delivery tube is not shown, the hose joint connected to the hose may be disassembled from the hose coupling 51 or the hose may be taken out as attached to the hose coupling by disengaging the bolt 53.

When the bolt 49 is disengaged, the end cover 47 may be dismantled from the boot 46.

When the end cover 47 is taken out, the pump cover 44 may be pulled out from the lower bracket 1 together with the boot 45. That is, the end cover 47 may be disengaged and replaced without touching the electrical components.

Manner of disassembly of the motor will be next explained. The motor may be disassembled either in a sequential order or only for the portion desired to be checked. Disassembly in the case of the sequential order will firstly be explained.

By disengaging the machine screws 57, the connector 55 may be pulled out of the seat 56 for the connector. The connector 55 may be separated if the lead wire connected to the terminal 62 will be disconnected. Under this condition, electrical conductivity of the submergible cable 54 may be observed.

Disengagement of the bolts 42 will enable the motor cover 41 to be taken out of the bearing support plate 33. In this case, it will be also possible that the wire at the side of the stator 36 and the circuit breaker 58 may be disengaged while the connector 55 is not disconnected but secured to the motor cover 41. Under this condition, electrical conductivity and other conditions of the stator 36 and the circuit breaker 58 may be observed, and the circuit breaker 58 may be replaced, as well.

When the bearing support plate 33 is axially lifted, it may be disengaged from the motor frame 31 and also separated from the upper ball bearing 34. In this way, the upper ball bearing 34 can be inspected or ready for replacement and also a part of the rotor 35 and stator 36 may be observed.

The motor frame 31 may be detached from the lower bracket 1 by shifting it axially upwardly after unscrewing the bolts 38, and the stator 36 may be pulled upwardly as well. After the motor frame 31 together with the stator has been pulled out, the condition of the rotor 35 and the lower ball bearing 28 may be observed.

In case that it is desired to investigate the condition of only the rotor 35, stator 36 and the lower ball bearings 28, or to see whether the motor of dry type is immersed with water or not, the end cover 47 and the pump cover 44 should be dismantled and if the bolts 38 are disengaged and the motor frame 31 is lifted upwardly, then the bearing support plate 33, the motor cover 41 and their relative parts may be lifted upwardly as a unit. In that case, the bearing support plate 33 may be lifted with the upper ball bearing 34 left at the pump shaft 7 to expose the rotor 35 and also the upper part of the lower bracket 1 so that existence of any immersion of water and the conditions of the rotor 35, the stator 36 and the lower ball bearing 28 may be observed.

In order to dismantle the lower ball bearing 28, the impeller 18 should be taken out as mentioned earlier with the lower bracket 1 left as it is and the machine screws 57 fixing the pressure plate 28a for the lower ball bearing 28 should be unscrewed to take out the pressure plate 28a. Then, when the pump shaft 7 will be pulled upwardly, the pump shaft 7 may be taken upwardly with the rotor 35, the upper ball bearing 34, the collar 34a and the lower ball bearing 28 as attached thereto and slid out of the sleeve 12. Under this condition, the lower ball bearing 28 may be exchanged.

Reassembly procedure is just opposite to the above-mentioned steps. In other words, the pump shaft 7 with the lower ball bearing 28, the rotor 35, the collar 34a, the upper ball bearing 34, and the wave washer 34b as attached thereto is inserted through the sleeve 12. Then the lower ball bearing 28 is fit in the bearing housing of the lower bracket 1, the pressure plate 28a is placed against the bearing housing and secured by means of the machine screws 28b. As the next step, the motor frame 31, the bearing support plate 33 and the motor cover 41 are assembled with the circuit breaker 58 incorporated therein, or else with the connector 55 connected to the submergible cable 54 thereby inserted into the seat 56 for the connector and secured by means of the machine screws. Such an assembly will then be put on the pump shaft 7 in such a manner as to encase the rotor 35. Then the motor frame 31 is fit into the lower bracket 1 with the seal ring 29 therebetween. At the upper part of the motor frame 31, the upper ball bearing 34 is fit with the bearing housing of the bearing support plate 33 and the motor frame 31 is jointed with the lower bracket 1. In case the connector 55 is connected, the wiring for the stator 36 and the circuit breaker 58 is connected to the terminal 62 and the connector 55 is inserted into the seat 56 for the connector and secured by means of the machine screws 57.

When the individual parts are to be assembled in a sequential order, the pump shaft 7 is attached to the lower bracket 1 together with the lower ball bearing 28 and then the motor frame 31 provided with the stator 36 is fit into the lower bracket 1 with the seal ring 29 therebetween and jointed thereto with the bolts 38. Subsequently the seal ring 32 is put into the motor frame 31, and the bearing support plate 33 is inserted into the motor frame 31 and the upper ball bearing 34.

Then the circuit breaker 58 is to be attached and the wiring for both the circuit breaker and the stator 36 is led through the center hole of the seat 56 for the connector of the motor cover 41, and the motor cover 41 is fit into the bearing support plate 33 with the seal ring 39 therebetween. Next the motor cover 41, the bearing support plate 33 and the motor frame 31 are tightened by means of the bolts 42.

The wiring extending to the terminal 62 of the connector 55 is connected and inserted into the seat 56 for the connector and the connector 55 is fixed by means of machine screws 57. The boot 45 of the pump cover 44 provided with the boots 45, 46 is then put on the lower bracket 1. To the boot 46 is attached the end cover 47 which is secured to the motor cover 41 by means of the bolts 49. In case that the hose coupling 51 is disconnected, then the hose coupling 51 is put on the end cover with the packing 52 in between and fixed by means of the bolts 53.

In the submergible motor pump according to the present invention, the liner ring portion and the dust seal portion are constructed in such a manner that small clearances may be provided between the annular projected part at the rear side of the main plate of the impeller and the boss of the impeller and the liner ring made of elastic material fixed at the side of the casing, and the balance holes are provided at the impeller nearer to the center of the impeller than the liner ring portion whereby the pressure imposed on the mechanical seal may be reduced. Besides, slurry may be prevented from entering the mechanical seal. Since the wear or abrasion due to the slurry may be limited to the liner ring and the impeller, these parts only may be exchanged. (In principle, the impeller is a replaceable part and therefore it has to be replaced with a new one if the front side of the impeller gets worn.) Since the liner ring is made of elastic material, there is no fear of the impeller getting locked even if the slurry is jammed in the liner portion and/or the dust seal portion of the liner ring.

As described earlier, according to the present invention, the submergible motor pump assembly is so constructed that the pump casing is provided with an aperture and secured with the stay bolts to enable the impeller to pass therethrough so that the impeller is detachably attached to the pump casing when the suction cover is taken out and the strainer is fit on the pump casing and fixed by the end of the stay bolts in a manner such that the pump base will depress the strainer. Accordingly the strainer may be detached by loosening the nut 27. In this way, the suction cover or the pump casing may be selectively disassembled. In either case, the impeller may be disassembled. Lubrication oil contained in the mechanical seal 6 may be drained from outside by taking out the plug 13. Furthermore, the movable elements of the mechanical seal may be taken out as a unit. Since the intermediate casing is jointed only with the lower bracket, it can be taken out independently of the motor section. As far as the motor section is concerned, the motor is covered by the pump cover, and the end cover and the end cover is jointed with the motor cover, whereby a delivery passage for the liquid of the pump may be inspected independently of the motor. With regard to the motor section, the motor cover is fit in the motor frame through the bearing support plate and joined, the seat for the connector of the motor cover is movable through the hole provided in the end cover and the connector is inserted into the seat for the connector, whereby the connector only may be readily pulled out to make it possible to check any disconnection of the submergible cable, as well as the irregularities of the wiring of the circuit breaker and the stator. By taking out the motor cover, direct observation of the circuit breaker is possible. Furthermore, by separating the sub-assembly including motor frame at the side of the stator, bearing support plate, motor cover and their relative parts as assembled from the lower bracket, a condition of possible immersion of water, irregularities of the rotor, and conditions of both upper and lower ball bearings may be inspected. It is also possible to readily inspect the pump shaft by pulling it off. The above-mentioned assembly of the motor section may be done with the submergible motor pump installed in a vertical position. It is not necessary to disassemble the impeller and the mechanical seal unless otherwise required.

In other words, in the submergible motor pump assembly, individual inspection is possible in respect to the pump section, and the motor section depending on what portion is desired to be checked. Furthermore, sequential disassembly is also available for the particular portion to be inspected, thus eliminating waste incurred to the disassembly work in the prior art. In the case that the pump shaft is inserted relative to the mechanical seal with the sleeve in between, it is easy to separate the mechanical seal and possible to quickly dismantle the pump shaft. Many advantages are also available accordingly in case of reassembly.

It is therefore easy to inspect such a submergible motor pump to be used for a liquid such as slurry and one can eliminate wasteful disassembly during preventive maintenance and periodical inspection, and reduce the time required for the disassembly operation.

The outlet for the submergible cable is constructed as already explained in a manner such that fluid tightness may be maintained around the outer periphery of the cable 54 by the relation between the cable 54 and the boot 92, between the boot 92 and the connector cover 88 and between the connector cover 88 and the connector 87 respectively, and around the core wire 54 of the cable, by the relation between the stuffing agent 95 and the connector 87. And air fluid tightness at the flange portion of the boot 92 may be maintained between the boot 92 and the motor cover 41 and the connector cover 88, and between the connector 87 and the motor cover 41. The above provides greater than double fluid seal construction. Besides, the material forming the respective parts is of water-proof composition so that water tightness is also available providing a sufficiently reliable seal. As such, if the connector with a terminal and the cover therefor are prepared in stock, commercially available cable may be utilized by only replacing the parts stored in stock, whereby replacement of cables may be made easier and air fluid tightness may be enhanced, because of more than doubled water tight construction, and safety may be highly augmented. Molding of the outlet portion for the cable is not done by vulcanizing the rubber but by stuffing resin or the like, requiring no special equipment for the purpose, but necessary molding work is to be done by an electrical engineer at the time of wiring.

What is claimed is:

1. A connector construction for connecting an electric cable to a motor section of a submergible pump comprising:

a terminal plate having terminals and adapted to be placed on an end cover of a motor section of said pump;

a hollow cylindrical cap having an open end a partly closed end at axially opposite ends thereof, respectively, said open end having means for sealingly engaging with said terminal plate so as to form a space into which a curable fixing agent may be introduced, said partly closed end having means for permitting an end portion of said cable to pass therethrough and for laterally supporting said end portion, said means for permitting and laterally supporting including means for introducing a fixing agent into said space, said cap having a tapered annular shoulder on an outer cylindrial surface thereof;

a boot made of elastic material and having an axial through hole through which said cable passes under intimate contact with said boot, said boot including a cylindrical portion having a bore for encasing therein a part of said cap, a cylindrical wall of said cylindrical portion terminating in an annular tapered end shaped to mate with said annular shoulder when the boot is placed over said part of said cap, said boot also including an annular tapering portion and a flange;

a cable seat portion formed on said end cover for the motor section, said seat portion including a cylindrical wall which forms a second space in which said terminal plate, said cover and the cylindrical portion of said boot may be disposed, the axial end of said cylindrical wall of said cable seat portion being adapted to closely engage with said flange of said boot when said boot is placed over said cap;

a metallic covering case having an internal configuration compatible with the outer configuration of said boot except for said cylindrical portion of said boot; and mechanical fastening means for fastening said metallic covering case to case cylindrical wall of said seat portion via said flange so that said terminals are completely sealed against water by firm engagement of said annular shoulder and said annular tapered end.

* * * * *